United States Patent [19]
Lee et al.

[11] Patent Number: 5,937,203
[45] Date of Patent: Aug. 10, 1999

[54] PORT FOR FINE TUNING A CENTRAL PROCESSING UNIT

[75] Inventors: Sherman Lee, Rancho Palos Verdes, Calif.; David G. Kyle, Austin, Tex.

[73] Assignee: Advanced Micro Devices, Inc., Sunnyvale, Calif.

[21] Appl. No.: 08/710,337

[22] Filed: Sep. 16, 1996

[51] Int. Cl.$^6$ ................................................ G06F 9/455
[52] U.S. Cl. ................ 395/800.43; 395/500; 395/800.39
[58] Field of Search .................... 395/800.15, 800.37, 395/800.39, 500, 527, 800.41, 800.42, 800.43

[56] References Cited

U.S. PATENT DOCUMENTS

| | | | |
|---|---|---|---|
| 4,792,955 | 12/1988 | Johnson et al. | 395/182.08 |
| 5,437,039 | 7/1995 | Yuen | 395/678 |
| 5,542,059 | 7/1996 | Blomgren | 395/800.41 |

OTHER PUBLICATIONS

Hastle et al., "The Implementation of Hardware Subroutines on Field Programmable Gate Arrays," IEEE, 1990, pp. 31.4.1 to 31.4.4.
DeHon, "DPGA–Coupled Microprocessors: Commodity ICs for the Early 21$^{st}$ Century," IEEE, 1994, pp. 31–39.
Butts, "Future Directions of Dynamically Reprogrammable Systems," IEEE, 1995, pp. 24.1.1 to 24.1.8.
Wirthlin et al., "A Dynamic Instruction Set Computer," IEEE, 1995, pp. 99–107.
Knopman et al., "Implementation of Hardware Structures Through Configurable Logic," IEEE, 1994, pp. 125–130.
Wazlowski et al., "PRISM–II Compiler and Architecture," IEEE, 1993, pp. 9–16.
"PowerPC 602 Aims for Consumer Products", Linley Gwennap, Microprocessor Report, Feb. 16, 1995, pp. 16–18.
"Intel's P6 Uses Decoupled Superscalar Design", Linley Gwennap, Microprocessor Report, Feb. 16, 1995, pp. 9–15.
"New Algorithm Improves Branch Prediction", Linley Gwennap, Microprocessor Report, Mar. 27, 1995, pp. 17–21.

"The Dr. Watson Diagnostic Tool", Technical Articles: Windows: Development Environment—Microsoft Development Library, pp. 1–7, May 1994.
"An Annotated Dr. Watson Log File", KB:Windows SDK KBase—Microsoft Development Library, PSS ID No.: Q81142, Jun. 1995, pp. 1–4.
"WW0440: The DrWatson and MSD Diagnostics", KB:Windows 3.x KBase—Microsoft Development Library, PSS ID No.: Q75020, Jul. 1995, pp. 1–7.
Wolfe, Alexander, "Intel equips its P6 with test and debug features", Elctronic Engineering Times Oct. 16, 1995 n870 p1 (2), Computer Select, Dec. 1995, pp. 1–3.
Graham, Andrew J., "Profiting from standards", Electronic Engineering Times Oct. 23, 1995 n871 p24 (2), Computer Select, Dec. 1995, pp. 1–3.

(List continued on next page.)

*Primary Examiner*—Meng-Ai T. An
*Assistant Examiner*—John Follansbee
*Attorney, Agent, or Firm*—Skjerven, Morrill, MacPherson, Franklin & Friel LLP; Omkar K. Suryadevara

[57] ABSTRACT

A central processing unit (hereinafter "CPU") has a number of functional units and a tuning port for modifying one or more parameters of the functional units (hereinafter "tunable units"). The combination (also called a "tuning assembly") formed by a tuning port and the tunable units allows a CPU to be fine tuned, i.e. take on different configuration profiles (as defined by the tunable units' parameters) for efficiently executing different application programs. Therefore, a CPU that includes a tuning assembly as described herein can take on a first configuration profile capable of most efficiently executing a first application program such as a computer game, and can take on a second configuration profile capable of most efficiently executing a second application program such as a spreadsheet and so on. The CPU's configuration profile can be changed even during the execution of an application program by changing the tunable units' parameters. Such fine tuning allows the CPU to execute different portions of an application program more efficiently than possible in the prior art.

40 Claims, 11 Drawing Sheets

OTHER PUBLICATIONS

Daniel, Wayne, "Test bus takes a ride on popular PCI", Electronic Engineering Times Oct. 16, 1995 n870 p55 (1), Computer Select, Dec. 1995, pp. 1–3.

Hlavaty, Joseph, "Exception Handlers and Windows Applications", Dr. Dobb's Journal on CD–ROM, Sep. 1994, pp. 1–15.

Pietrek, Matt, "Postmortem Debugging", Dr. Dobb's Journal on CD–ROM, Sep. 1992, pp. 1–12.

"Nx686 Goes Toe–to–Toe With Pentium Pro", Linley Gwennap, Microprocessor Report, Oct. 23, 1995, pp. 6–10.

"Hal Reveals Multichip SPARC Processor", Linley Gwennap, Microprocessor Report, Mar. 6, 1995, pp. 6–11.

"Computer Organization and Design", John L. Hennessy, etc., Morgan Kaufmann Publishers, Chapter 7, pp. 502–504.

"Intel Equips Its P6 With Test and Debug Features", Alexander Wolfe, Electronic Engineering Times, Oct. 16, 1995, pp. 1, 106.

"P6 Stirs Up Software Issues", Alexander Wolfe, Electronic Engineering Times, Oct. 30, 1995, p. 22.

"Intel's Potent P6 Premiers", Alexander Wolfe, Electronic Engineering Times, Oct. 30, 1995, pp. 1, 22, 24.

Pentium™ Processor User's Manual, vol. 1, Chapter 3, Intel, 1993, pp. 3–1 to 3–25.

The Complete X86, John Wharton, vol. II, Chapter 20, 1994, pp. 639–679.

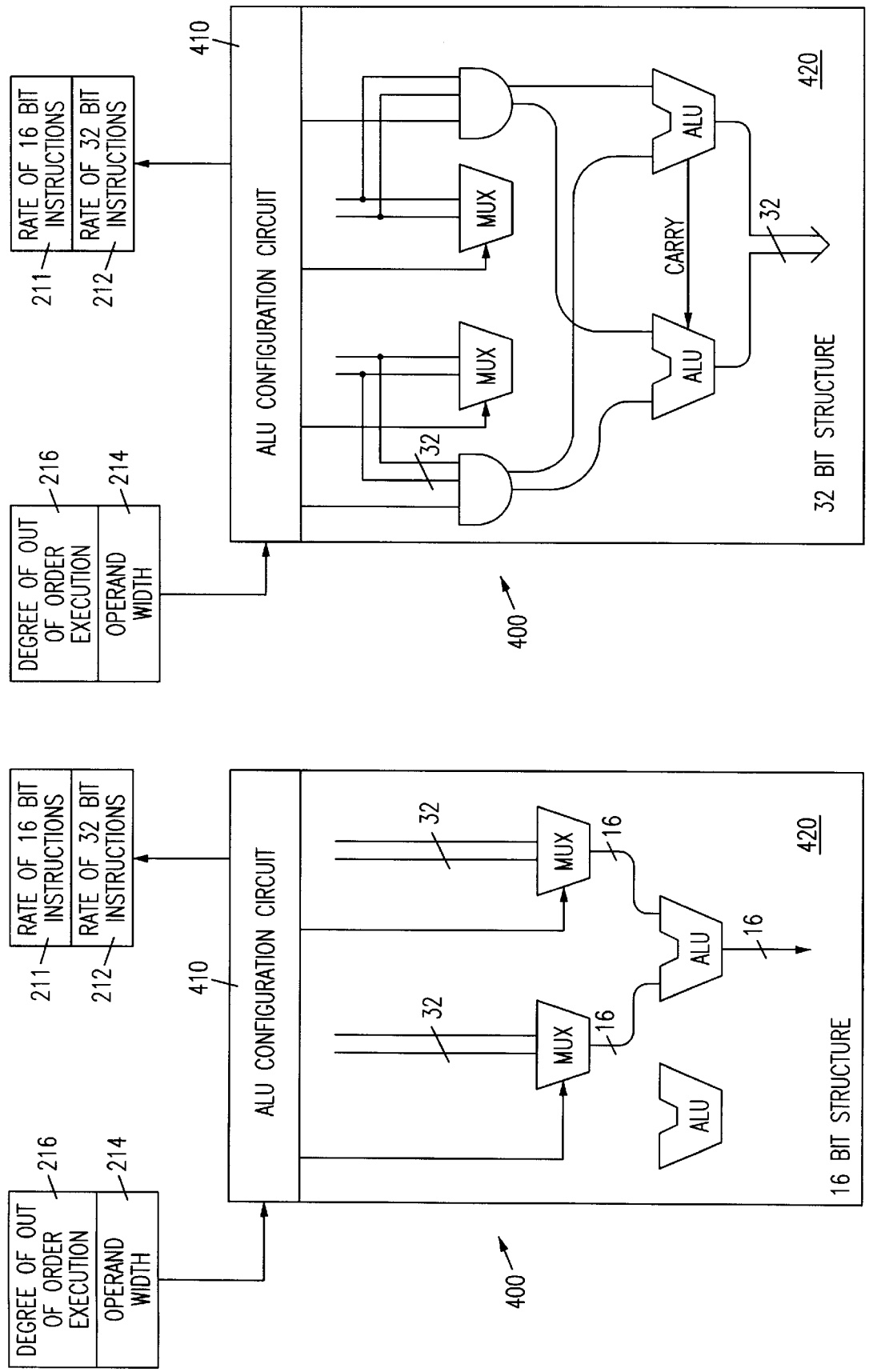

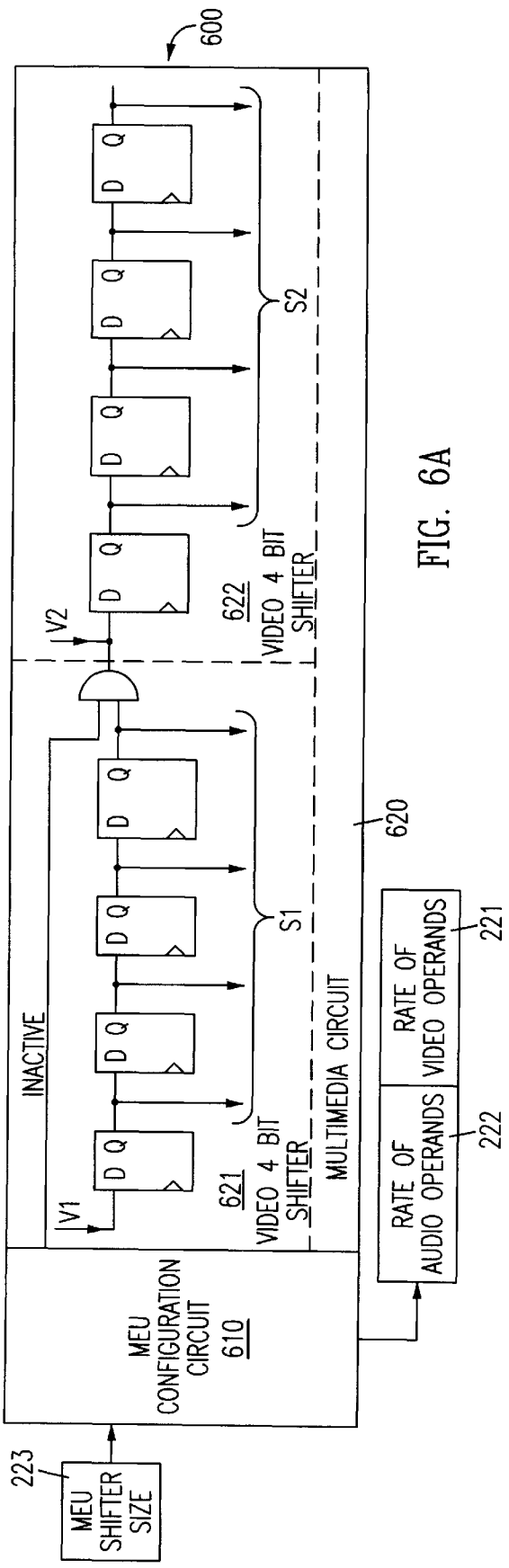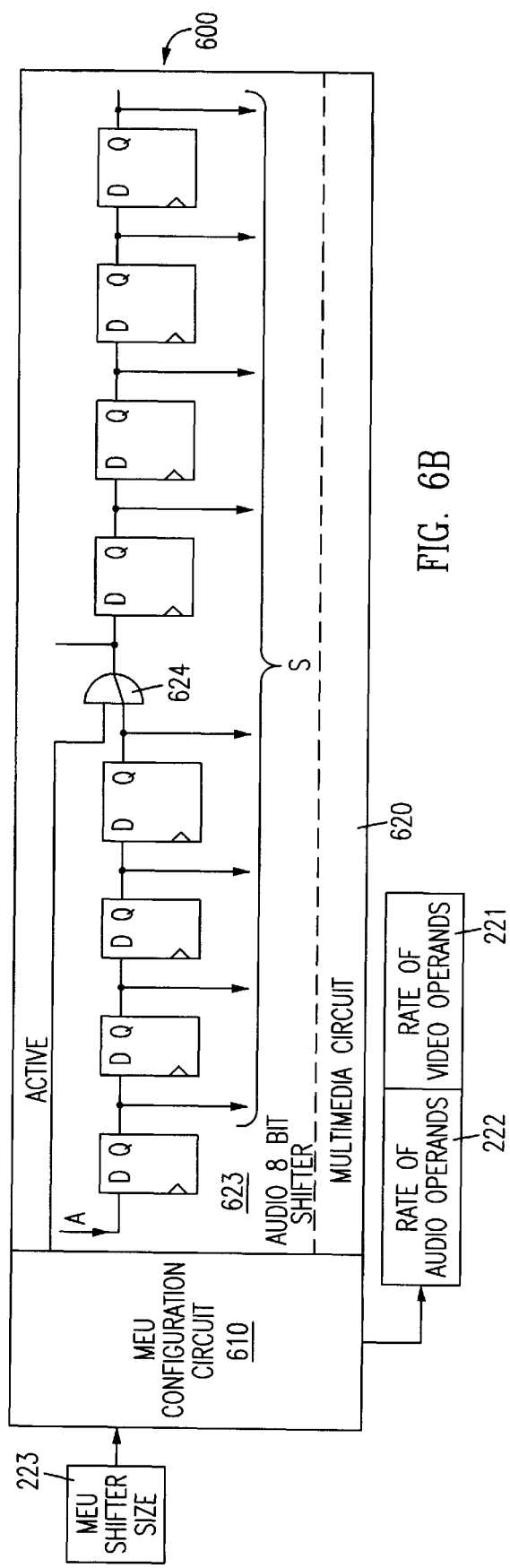
FIG. 6A
FIG. 6B

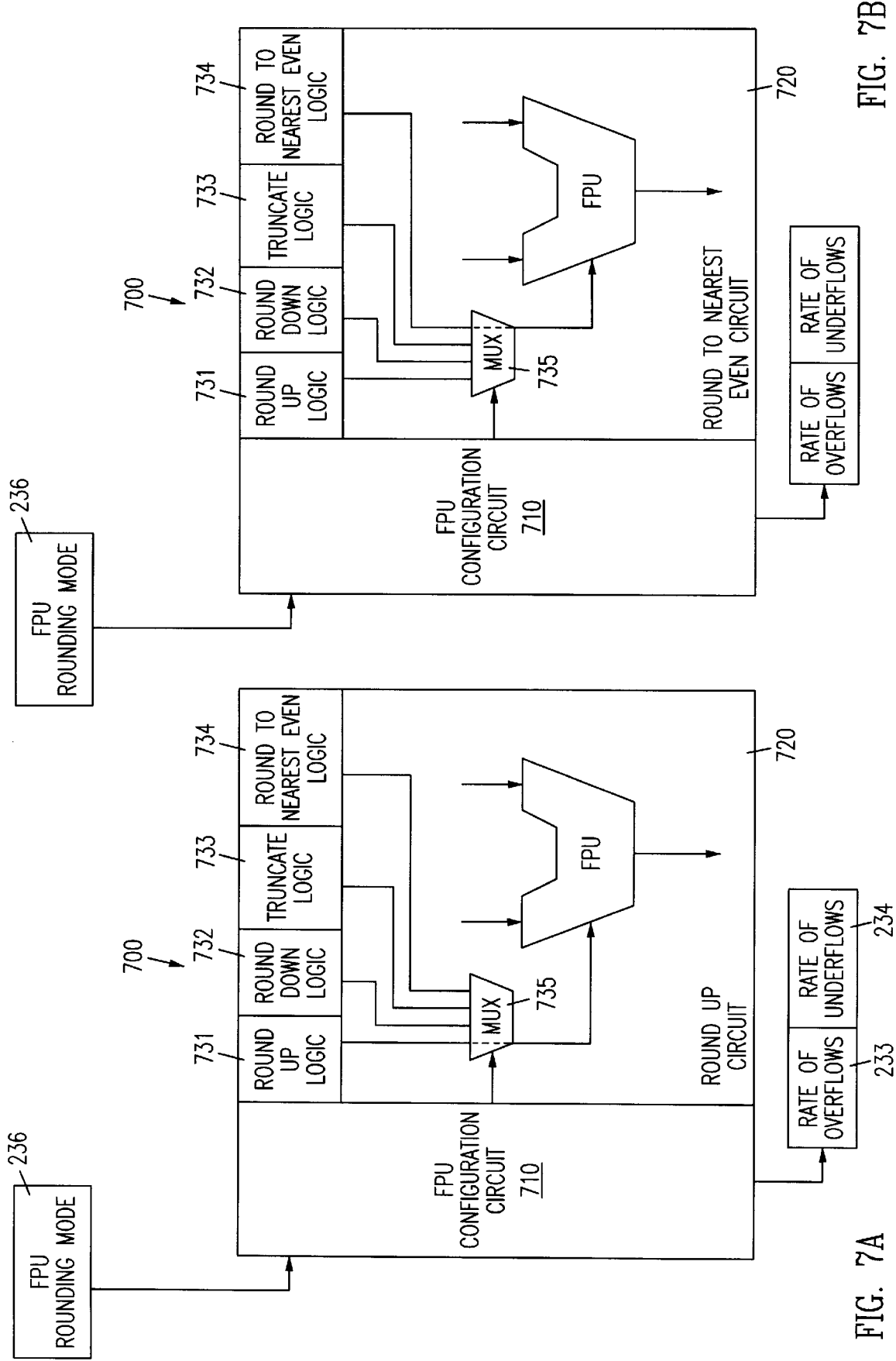

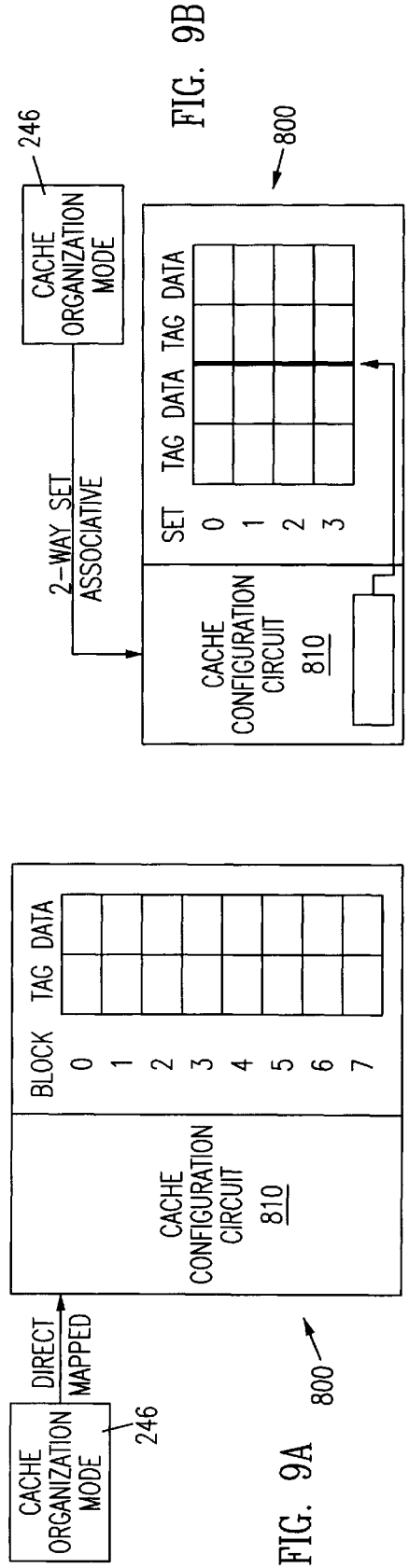

PORT FOR FINE TUNING A CENTRAL PROCESSING UNIT

CROSS-REFERENCE TO RELATED APPLICATIONS

This application is related to and incorporates by reference herein in their entirety the following commonly owned, concurrently filed, copending U.S. Patent Applications:

1. "A Method For Changing Operation of Circuitry in A CPU Based on a Statistic of Performance of the CPU" by Sherman Lee and David G. Kyle, now U.S. Pat. No. 5,812,425; and
2. "A Method For Identifying And Correcting Errors In A Central Processing Unit" by Sherman Lee and David G. Kyle, U.S. application Ser. No. 08/710,336, filed Sep. 16, 1996.

FIELD OF THE INVENTION

This invention relates to a device for changing the structure and operation of a central processing unit (CPU). In particular, this invention relates to a device, such as a port, in a CPU that can modify one or more parameters of a number of functional units included in the CPU, thereby to fine tune operation of the CPU.

BACKGROUND OF THE INVENTION

A conventional microprocessor, such as INTEL'S P6, has a predetermined configuration (resulting from design trade-offs) that allows certain types of application programs to run faster than other types. For example, INTEL'S P6 is optimized for 32-bit software, i.e. runs application programs having 32-bit programming model faster than application programs having 16-bit programming model.

Specifically, an article "P6 stirs up software issues", by Alexander Wolfe, Electronic Engineering Times, Oct. 30, 1995, page 22 states: "a 133-MHz P6 running Windows 3.1 runs 10 to 20% slower than a Pentium". The article also cites an INTEL warning that "programs that intermix . . . use of 8-, 16- and 32-bit registers can result in partial pipeline stalls, which slow performance."

According to Wolfe, "Intel is providing special optimizing compilers and a software performance aide called the Visualized Tuning Tool (V Tune)." However, such tools fail to improve the performance of application programs (such as 16-bit code) that predate the P6. Therefore, to use INTEL's P6 a user must discard such preexisting software and buy a new generation of 32-bit software at a considerable expense.

Conventional microprocessors, such as INTEL's PENTIUM™ have one or more on-chip caches with "modes", such as a "cache disabled" (CD) mode and a "not write thru" (NW) mode. The PENTIUM's modes are described in "Pentium™ Processor User's Manual" (see in particular Volume 1, Chapter 3) available from Intel Corporation, Literature Sales, PO Box 7641, Mt. Prospect, Ill. 60056-7641 that is incorporated by reference herein in its entirety. For example, setting a bit CD to 0 in register CR0 of the PENTIUM™, results in disabling a cache in the PENTIUM™(see Table 3-2 of the above-incorporated manual). Moreover, Intel states that "the cache must be flushed after being disabled . . . ".

SUMMARY

A central processing unit (hereinafter "CPU") in accordance with the invention has a number of functional units and a tuning port for fine tuning the functional units. The tuning port can be used to modify one or more parameters of the functional units (hereinafter "tunable units") so that the tunable units operate in harmony with software to be executed by the CPU. The functional units' parameters (also called "multi-valued parameters") can have one of a number (e.g. 4) of different values selectable from a predetermined range (e.g. programming model sizes of 8 bit, 16 bit, 32 bit and 64 bit).

Moreover, a combination (also called "tuning assembly") formed by the tuning port and the tunable units allows the CPU as a whole to be fine tuned, i.e. take on different configuration profiles depending on the characteristics (such as loopiness) of the software to be executed. The configuration profiles are defined by the tunable units' parameters (such as a cache's prefetch size) that can be changed for efficient execution of application programs having characteristics different from one another. As the parameters are multi-valued, the tunable units' behavior can be changed gradually and incrementally, so that the CPU can be kept in tune with the changing needs of one or more application programs.

Specifically, a CPU (such as a microprocessor) that includes a tuning assembly as described herein can take on a first configuration profile capable of efficiently executing a first application program, such as a computer game. The same microprocessor can also take on a second configuration profile capable of efficiently executing a second application program, such as a spreadsheet. The microprocessor's configuration profile (hereinafter simply "profile") can be changed "on the fly", e.g. by interrupting the execution of an application program, changing the tunable units' parameters and resuming execution of the application program.

Such "on the fly" fine tuning allows a microprocessor to execute different portions of an application program with profiles suitable to those portions, and therefore execute the application program as a whole more efficiently. Such "on the fly" fine tuning also allows efficient execution even in case a user switches between two different applications. Finally, "on the fly" fine tuning allows two different operating systems, such as MICROSOFT WINDOWS and APPLE MACINTOSH to fine tune the same CPU depending on their specific characteristics.

In one embodiment, the tuning port is responsive to signals (hereinafter "parameter signals") that are indicative of parameters of a to-be-implemented profile, and that are received at a number of configuration input terminals included in the tuning port. The to-be-implemented profile's parameter signals (also called "shadow parameter signals") may be received at external pins, e.g. from an in-circuit emulator, or from an on-board execution unit on execution of certain instructions.

The tuning port's configuration output lines are coupled to the tunable units, and pass to the tunable units the currently-implemented profile's parameters signals (also called "current parameter signals"). The tuning port also receives from the tunable units a number of statistics signals on a number of statistics input lines coupled to the tunable units. The tuning port makes the received statistics signals available (either unmodified or averaged in two embodiments) at a number of statistics output terminals included in the tuning port.

In one variant of this embodiment, the tuning port has a first set of storage elements (hereinafter "shadow storage elements") that hold the received shadow parameter signals and a second set of storage elements (hereinafter "current storage elements") that hold the current parameter signals. The tuning port copies the shadow parameter signals into the current storage elements and drives the copied parameter signals on to the configuration output lines in response to an active signal on the configuration switch terminal.

In this variant, the tuning port's storage elements can be organized into multi-parameter groups specific to each characteristic of the CPU. For example, a multi-parameter execution group of storage elements is associated with execution, a multi-parameter "cache" group of storage elements is associated with a cache and a multi-parameter FPU group of storage elements is associated with a floating point unit.

An active signal on the configuration switch terminal can be generated by a flip-flop, for example on execution of a return from interrupt instruction if signals in a current storage element and the corresponding shadow storage element differ from each other. Alternatively, an active signal on the configuration switch signal can be received at an external pin of the microprocessor, for example from an in-circuit emulator.

The tuning port also includes a number of statistics storage elements coupled between the unit statistics lines and the statistics terminals. The statistics storage elements store statistics signals from the unit statistics lines and drive the stored statistics signals on the statistics terminal.

Tunable units in one embodiment of the invention include a pipeline, an arithmetic logic unit, a bus interface unit, a cache, a branch prediction unit and a floating point unit. Each tunable unit has a unit input terminal coupled to a different one of the configuration output line of the tuning port. Depending on a signal on the unit input terminal, each tunable unit reorganizes itself into one of a number of predetermined structures specific to that unit. Each tunable unit also has a unit output terminal, and drives a statistics signal on the unit output terminal. The statistics signals can be used to determine efficiency of the tunable unit while operating in a specific predetermined structure. Such statistics signals can also be analyzed to determine the efficiency of the CPU as a whole.

BRIEF DESCRIPTION OF THE DRAWINGS

FIGS. 4A and 4B illustrate respectively, two different predetermined structures of a tunable arithmetic logic unit (ALU) in accordance with the invention.

FIGS. 6A and 6B illustrate respectively, two different predetermined structures of a tunable multimedia execution unit (MEU) in accordance with the invention.

FIGS. 7A and 7B illustrate respectively, two different predetermined structures of a tunable floating point unit (FPU) in accordance with the invention.

FIGS. 9A–9D illustrate a cache with four different cache organization modes.

DETAILED DESCRIPTION

Figure 1:
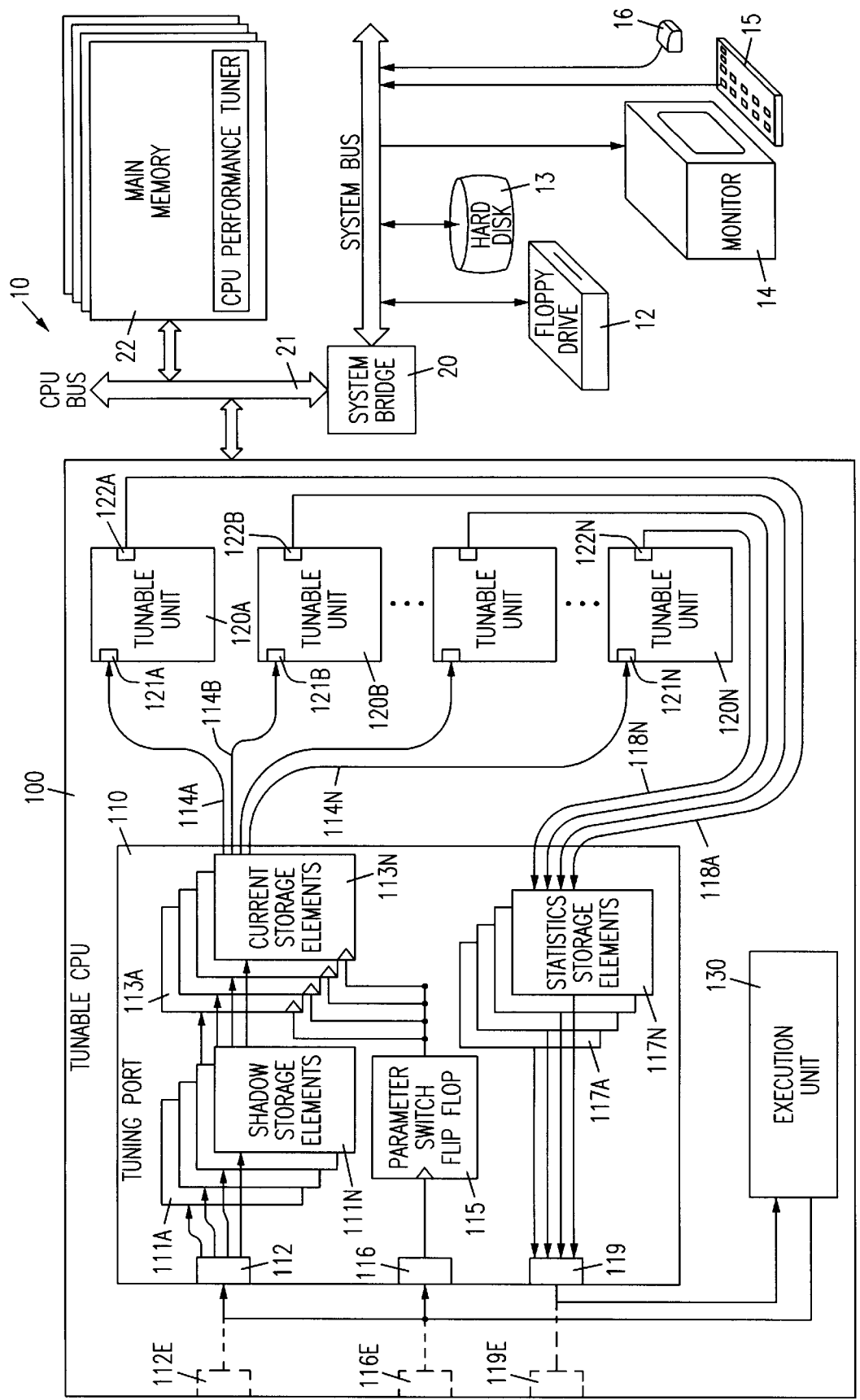
FIG. 1 illustrates in a high level block diagram, a computer system included a tunable CPU having a fine tuning port and a number of fine tunable units in accordance with the invention.

A microprocessor in accordance with the invention includes a number of functional units and a tuning port for monitoring and fine tuning the functional units. The functional units (hereinafter "tunable units") can be fine tuned by modifying one or more parameters so that the tunable units operate in harmony with (e.g. in tune with needs of) application programs being executed by the CPU. Each parameter (also called "multi-valued parameter") can have one of a number (e.g. 1024) of different values selectable from a predetermined range (e.g. cache size in the range 0–1023 bytes).

Therefore, a CPU in accordance with the invention can take on different configuration profiles (defined by the parameters) depending on the application programs being executed. Such a degree of fine tuning is not possible when a cache is merely disabled and enabled, for example, by use of a single-valued signal (e.g. an ON/OFF signal).

In one embodiment, a computer system 10 includes a system bus 11 that is connected to a number of peripherals such as a floppy drive 12, a hard disk 13, a monitor 14, a keyboard 15 and a mouse 16. System bus 11 is coupled by a system bridge 20 to a CPU bus 21 that in turn is coupled to a main memory 22. CPU bus 21 also coupled to a central processing unit (hereinafter "tunable CPU") 100 that includes a fine tuning port 110. Fine tuning port (hereinafter "tuning port") 110 includes the first set of storage elements (hereinafter "shadow storage elements") 111A–111N, that store a number of parameter signals received at a number of configuration input terminals 112. Tuning port 110 also includes a second set of storage elements (hereinafter "current storage elements") 113A–113N that drive parameter signals on a number of configuration output lines 114A–114N.

Fine tuning port 110 also includes a flip-flop (hereinafter "parameter update flip-flop") 115 that is coupled to a configuration switch terminal 116 of the fine tuning port 110. In response to an active signal on configuration switch terminal 116, parameter switch flip-flop drives a signal active on one of lines 117A–117N that cause current storage elements 113A–113N to clock a signal from shadow storage elements 111A–111N out to the configuration output lines 114A–114N.

A signal on configuration switch terminal 116 can be driven active on an eternal pin 116E either by an external device, such as an in-circuit emulator 30 (FIG. 1) or alternatively by execution unit 130 on execution of an instruction, e.g. a write into a model specific register 140.

Model specific register 140 can be implemented as described in, for example, "The CPU and Undocumented Instructions,"Chapter 3 "The Undocumented PC" by Frank Van Gilluwe, Addison-Wesley Publishing Company, Reading, Mass., that is incorporated by reference herein in its entirety.

Also, a signal on configuration switch terminal 116 can also be driven by use of boundary-scan (JTAG) and built-in self-test (BIST) structures, in a manner well known to a person of skill in the art of designing microprocessors in view of the enclosed disclosure.

Although specific circuitry is described herein for a particular embodiment of the invention, other such embodiments will be obvious to the skilled person in view of the enclosed disclosure. Accordingly, the embodiments described herein are merely illustrative and not limiting.

In this embodiment, fine tuning port 110 also includes a third set of storage elements (hereinafter "statistics" storage elements) 117A–117N that receive a number of statistics signals on statistics input lines 118A–118N also included in fine tuning port 110. Fine tuning port 110 supplies the stored statistics signals on statistics terminals 119.

In this embodiment, tunable CPU 100 also includes a number of fine tunable units 120A–120N that are coupled to fine tuning port 110. Specifically, fine tunable units 120A–120N receive a number of parameter signals at unit input terminals 121A–121N that are coupled to the configuration output lines 114A–114N of fine tuning port 110. Moreover, fine tunable units 120A–120N also have a number of unit output terminals 122A–122N that are coupled to statistics input lines 118A–118N of fine tuning port 110.

Tunable CPU 100 also includes an instruction execution unit 130 that is coupled to configuration input terminals 112A, configuration switch terminal 116 and statistics output terminals 119. Instruction execution unit 130 analyzes the statistics signals available at statistics output terminals 119 to determine the parameter signals to be supplied to configuration input terminals 112 and after supplying all of the necessary parameter signals, drives a signal active on the configuration switch terminal 116 to thereby cause tunable CPU 100 to assume a new configuration profile.

Fine tunable units 120A–120N have internal structures that can be changed (logically) to behave differently depending on the parameter signals received at unit input terminals 121A–121N. As a parameter signal can have one of a number of values, each of fine tunable units 120A–120N can be changed gradually and incrementally depending on the needs of the application programs. Fine tunable units 120A–120N also provide a measure of performance of the structures at the unit output terminals 122A–122N.

Although in the embodiment illustrated in FIG. 1, each of current storage elements 113A–113N is connected by one of configuration output lines 114A–114N to one of fine tunable units 120A–120N, any number of current storage elements can be coupled to a single fine tunable unit. Fine tunable units 120A–120N can be any type of a functional unit, such as a branch prediction unit, a floating point unit, a multimedia execution unit, a cache, a pipeline and an arithmetic logic unit.

Although in FIG. 1, each fine tuneable unit 120A–120N is illustrated as being coupled to only one of current storage elements 113A–113N and one of statistics storage elements 117A–117N, any number of such storage elements can be coupled to a single fine tuneable unit in tuneable CPU 100.

Figure 2:
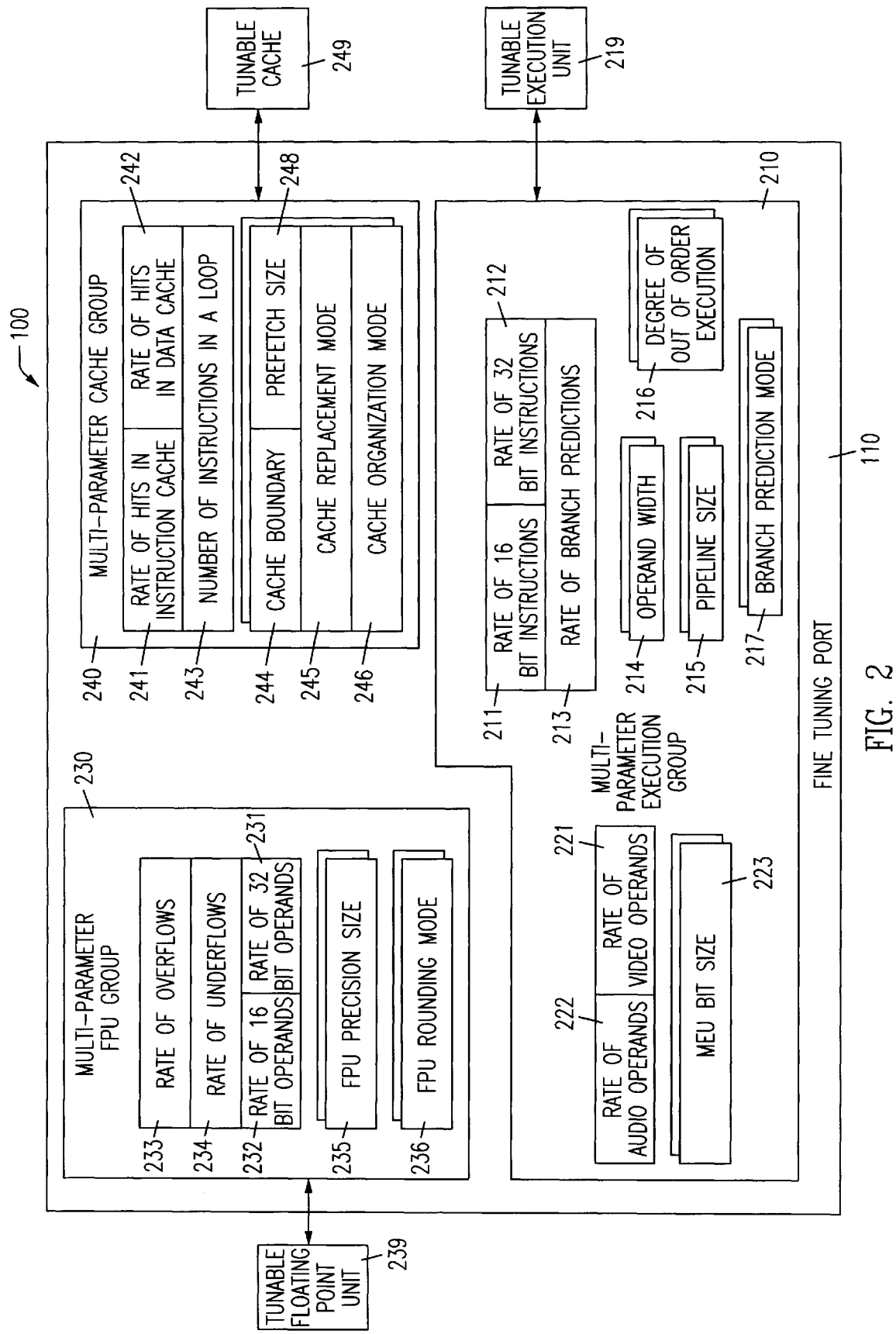
FIG. 2 illustrates the various registers in the fine tuning port of FIG. 1.

In one particular embodiment, a first group (hereinafter "multi-parameter execution group") of storage elements 210 (FIG. 2) includes statistic storage elements 211–213 and 221–222 and current storage elements 214–217 and 223 all of which are coupled to an execution unit 219 (that includes a multimedia unit). Statistic storage elements 211–213, 221–222 respectively store the signals RATE OF 16 BIT INSTRUCTIONS, RATE OF 32 BIT INSTRUCTIONS, RATE OF BRANCH PREDICTIONS, RATE OF VIDEO OPERANDS and RATE OF AUDIO OPERANDS.

Current storage elements 214–217 and 223 store parameters signals INSTRUCTION WIDTH, PIPELINE SIZE, DEGREE OF OUT OF ORDER EXECUTION, BRANCH PREDICTION MODE and MEU BIT SIZE. After assessment of CPU 110's execution from the statistics signals in the statistic storage elements 211–213 and 221–222, the parameter signals and storage elements 214–217 and 223 can be changed as necessary, thereby to change the structure (logically) and operation of execution unit 219 as described more completely below in reference to FIGS. 3A–3B, 4A–4B, 5A–5B and 6A–6B.

Fine tuning port 110 also includes a second group (hereinafter "multi-parameter FPU group") 230 formed of a number of statistics storage elements 231–234 and a number of current storage elements 235–236. Statistic storage elements 231–234 are used to store the statistic signals RATE OF 16 BITS OPERANDS, RATE OF 32 BIT OPERANDS, RATE OF OVERFLOWS and RATE OF UNDERFLOWS. Current storage elements 235 and 236 are used to store the parameter signals FPU PRECISION SIZE and FPU ROUNDING MODE. All of storage elements 231–236 and FPU tuning group 230 are coupled to, and are used to tune tuneable floating point unit 239 as described more completely below in reference to FIGS. 7A–7B.

Figure 8B:
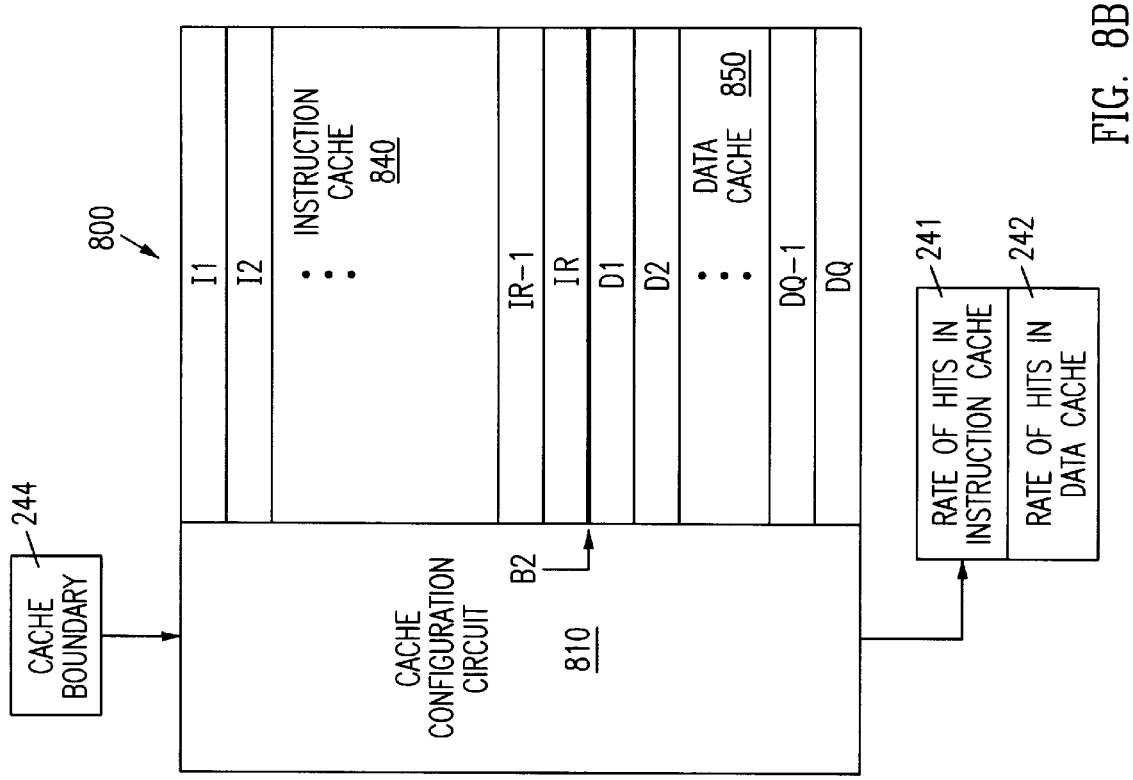
FIGS. 8A–8B, 8C–8D, 8E–8F illustrate a cache with, respectively, two different cache sizes, two different prefetch sizes and two different cache replacement modes.
Figure 8A:
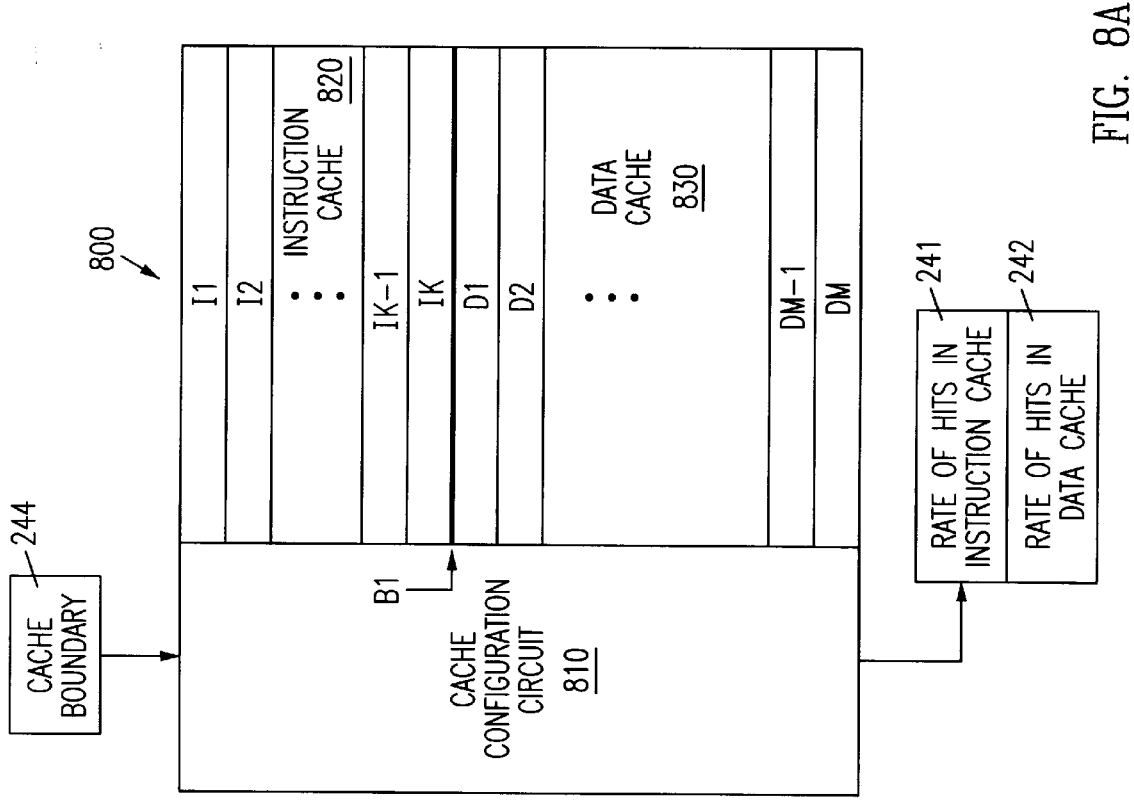

Finally, fine tuning port 110 includes a third group (hereinafter "multi-parameter cache group") 240 formed by statistics storage elements 241–243 and current storage elements 244–247 that are coupled to and are used to tune tuneable cache 249. Specifically, statistic storage elements 241–243 store the signals RATE OF HITS IN INSTRUCTION CACHE, RATE OF HITS IN DATA CACHE and NUMBER OF INSTRUCTIONS IN A LOOP. Current storage elements 244–247 store the parameter signals CACHE SIZE, CACHE REPLACEMENT MODE, PREFIX SIZE, CACHE ORGANIZATION MODE and MEMORY UPDATE MODE respectively. Storage elements 241–248 are coupled to and are used to tune i.e. change the structure and operation of tuneable cache 249, as described more completely below in reference to FIGS. 8A–8B . . . 12A–12D.

In one embodiment, tuneable execution unit 219 includes a tuneable pipeline 300 (FIG. 3A) having a pipeline configuration circuit 310 that is coupled to current storage element 215 and that is tuned by the parameter signal PIPELINE SIZE. Tuneable pipeline 300 also includes pipeline stages 321–325 of the type described in, for example, INTEL's "Pentium™ Processor User's Manual" Vol. 1, Chapter 3 that is incorporated by reference above. The five stages 321–325 included in tuneable pipeline 300 are determined by pipeline configuration circuit 310 based on the parameter signal PIPELINE SIZE being of value 5.

Figures 3A, 3B:
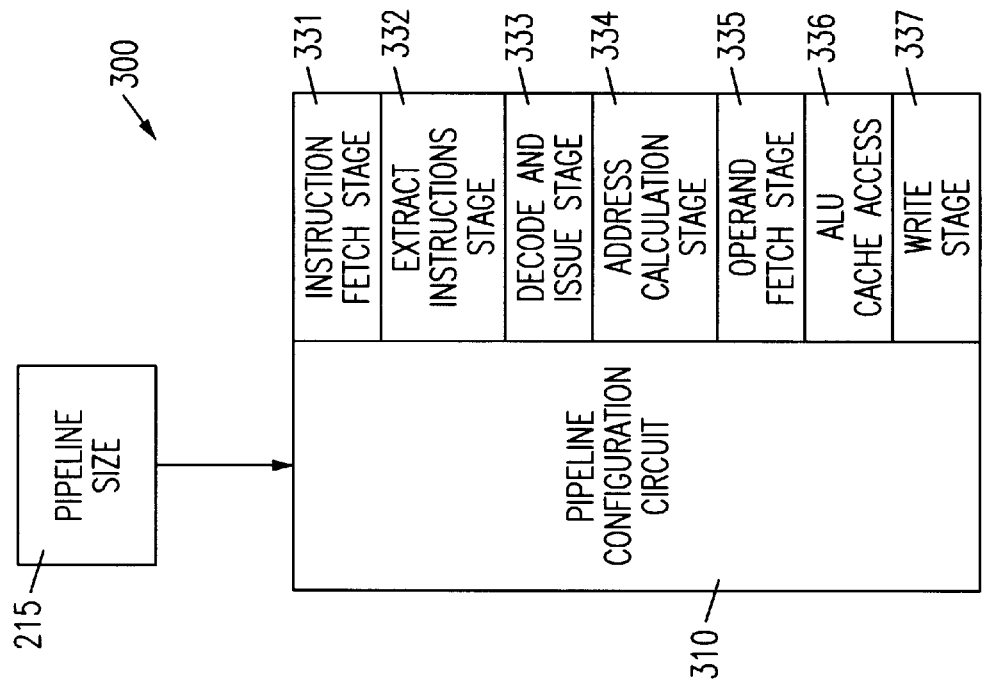
FIGS. 3A and 3B illustrate respectively, two different predetermined structures of a tunable pipeline in accordance with the invention.

If parameter signal PIPELINE SIZE indicates, for example, 7 stages, then pipeline configuration circuit 310 rearranges the circuitry included in pipeline stages 321–325, and uses additional circuitry as necessary to form pipeline stages 331–337 (FIG. 3B). Pipeline stages 331–337 include two additional stages extract instructions stage 332 and operand fetch stage 335 in addition to the five stages described above.

Although two predetermined structures, a 5 stage pipeline and a 7 stage pipeline are illustrated in the respective FIGS. 3A and 3B as being included in tuneable pipeline 300, longer pipelines, such as a 12 stage pipeline described in, for example, "Intel's P6 Users Decoupled Super Scaler Design" by Linley Gwennap, Microprocessor Report, Feb. 16, 1995, pages 9–15 can also be used.

Alternatively, for serialized scaler operations, a smaller pipeline as described in, for example, "i486™ Processor Hardware Reference Manual", Intel Corp., 1990, Chapter 2 that is incorporated by reference herein. The actual circuitry of tuneable pipeline 300 in one embodiment is obvious to a person skilled in the art of designing microprocessors in view of the enclosed disclosure. Depending on the embodiment, additional stages can be added to allow superpipelined operation and increased frequency of operation.

Tuneable execution unit 219 also includes a tuneable arithmetic logic unit (ALU) 400 (FIG. 4A). Tuneable ALU 400 includes an ALU configuration circuit computation circuit 420 that has a 15 bit structure in FIG. 4A. The 15 bit structure is indicated to the ALU configuration circuit 410 by a value 16 of parameter signal OPERAND WIDTH from current storage element 214. When signaL OPERAND WIDTH indicates 32, ALU configuration circuit 410 rearranges the circuitry 420 to have a 32-bit structure, for example as illustrated in FIG. 4B.

During operation of circuitry 420 in either of the two predetermined structures, e.g. 16-bit structure and 32-bit structure, the circuit 420 drives signals RATE OF 16-BIT INSTRUCTIONS and RATE OF 32-BIT INSTRUCTIONS that are stored in statistics storage elements 211 and 212. Therefore, depending on the larger of the signals stored in statistics storage elements 211 and 212, circuit 420 can have one of the two structures, 16-bit structure and 32-bit structure illustrated in FIGS. 4A and 4B respectively. Although only two structures are illustrated for clarity in FIGS. 4A and 4B, other embodiments have more structures, for example, 8-bit structures, 16-bit structures, 32-bit structures and 64-bit structures.

Therefore, a CPU in accordance with the invention can be tuned to execute application programs having a 16-bit programming model faster than execution of application programs having a 32-bit programming model, or vice versa, depending on the structures and arrangement of the structures that is used.

Moreover, depending on the signal DEGREE OF OUT OF ORDER EXECUTION from current storage element 216, ALU configuration circuit 410 can use, for example, two ALUs in parallel, thereby to allow superscalar execution of sequential instructions, out of order with each other. The number of such instructions executed out of order depends on the number of reorder buffers which in turn depends on the parameter signal DEGREE OF OUT OF ORDER EXECUTION. Therefore, the same ALU configuration circuit 410 is responsive to two parameter signals (stored in respective current storage elements 214 and 216).

Tuneable execution unit 219 also includes a tuneable branch prediction unit (BPU) 500 (FIG. 5A) that includes a branch configuration circuit 510 coupled to current storage element 217 and statistics storage element 213. When signal BRANCH PREDICTION MODE in current storage element 217 is inactive, tuneable BPU 500 includes a "backward taken forward not taken" logic 520 that uses a branch target cache 530 for branch prediction.

Alternatively, when signal BRANCH PREDICTION MODE is active, branch configuration circuit 510 rearranges the circuitry in tuneable BPU 500 to form a branch prediction logic 540 that uses a branch target buffer 550. Branch target buffer 550 includes a branch target address cache 551, a branch history table 552 at one or more pattern tables 553 of the type described in, for example, the "Pentium™ Processor User's Manual" incorporated by reference above.

Figure 5B:
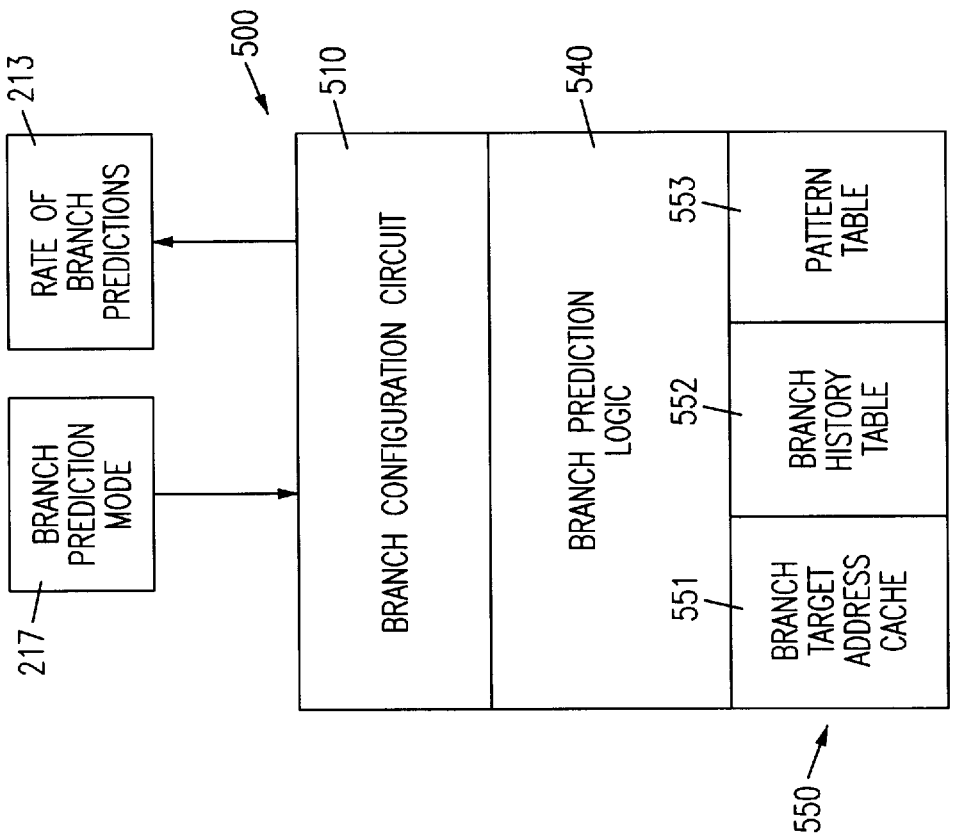
FIGS. 5A and 5B illustrate respectively, two different predetermined structures of a tunable branch prediction unit (BPU) in accordance with the invention.
Figure 5A:
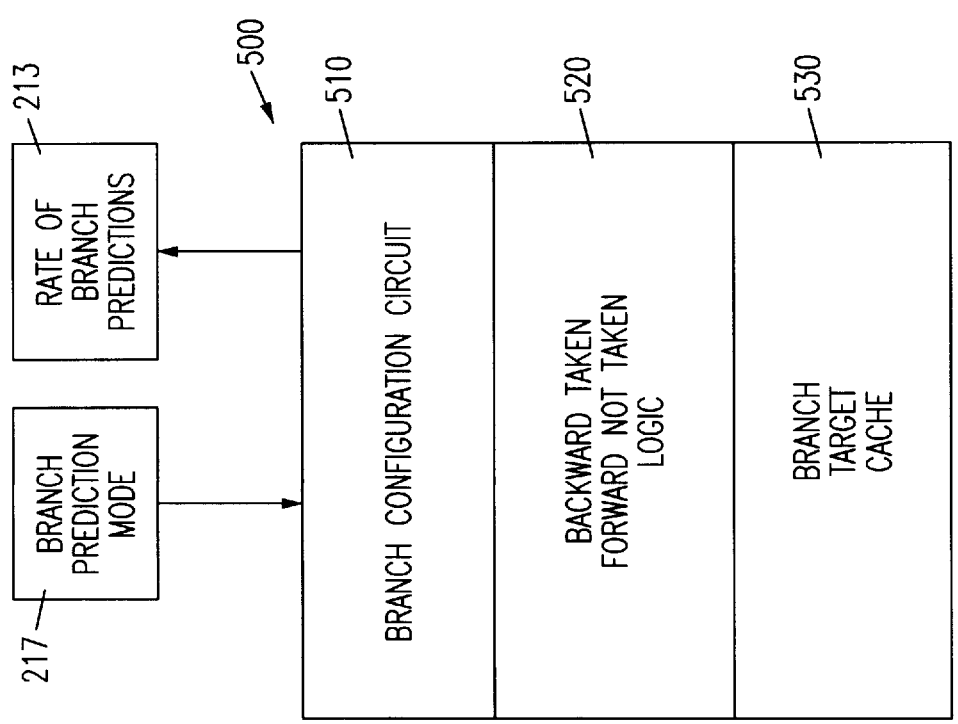

Therefore tuneable BPU 500 has one of two predetermined structures illustrated in FIGS. 5A and 5B, depending on the signal BRANCH PREDICTION MODE. Branch configuration circuit 510 drives the signal RATE OF BRANCH PREDICTIONS that is stored in statistics storage element 213, and can be used to change the signal BRANCH PREDICTION MODE.

In one embodiment, a tuneable multimedia execution unit (MEU) 600 includes a MEU configuration circuit 610 that is coupled to current storage element 223 and statistics storage elements 221 and 222. Tuneable MEU also includes a multimedia circuit 620 that includes a first predetermined structure formed by 4-bit shifters 621 and 622 that convert to video signals V1 and V2 into 4-bit signals S1 and S2. MEU configuration circuit 610 rearranges 4-bit shifters 621 and 622 into an 8-bit shifter 623 (FIG. 6B) by driving a control signal active to an AND gate 624 that couples 4-bit shifter 621 to 4-bit shifter 622. 8-bit shifter 623 converts an audio signal A into an 8-bit byte S.

MEU configuration circuit 610 drives the signal to AND gate 624 active or inactive, depending on the signal MEU SHIFTER SIZE stored in current storage element 223. MEU configuration circuit 610 keeps track of the rate of audio and video operands being processed therein and supplies signals RATE OF AUDIO OPERANDS and RATE OF VIDEO OPERANDS for storage in statistic storage elements 221 and 222.

Tuneable CPU 100 includes a tuneable floating point unit (FPU) 700 (FIG. 7A). Tuneable FPU 700 includes a FPU configuration 710 that is coupled to current storage element 236 and statistic storage elements 233 and 234. Tuneable FPU 700 includes a circuit 720 having "round up" logic 731 selected from logics 731–734 by multiplexer 735 depending on a signal from FPU configuration circuit 710.

Alternatively, circuit 720 can have a "round to nearest even" structure that is selected by multiplexer 735. Any one of the logics 731–734 can be selected by multiplexer 735 depending on the signal from FPU configuration circuit 710. FPU configuration circuit 710 simply passes the signal FPU ROUNDING MODE that is stored in current storage element 236. FPU configuration circuit 710 also keeps track of the number of times an overflow or an underflow situation occurs, and drives the signal RATE OF OVERFLOW and RATE OF UNDERFLOWS.

Although not illustrated in FIGS. 7A–7B tuneable FPU 700 is also responsive to a signal FPU PRECISION SIZE from current storage element 235 that is coupled to FPU configuration circuit 710. FPU configuration circuit 710 changes the number of bits used by tuneable FPU 700 depending on the signal storage element 235, in a manner similar to that described above for tuneable MEU 229.

Tuneable CPU 100 also includes a tuneable cache 800 (FIG. 8A) having a cache configuration circuit 810 that is coupled to current storage element 244 and statistics storage element 241 and 242. Tuneable cache 800 also includes a first set of storage elements I1, I2 . . . IK collectively referred to as instruction cache 820 and a second set of storage elements D1, D2 . . . DM collectively referred to as data cache 830.

In this embodiment, cache configuration circuit 810 separates the storage elements I1–IK from the storage elements D1–DM by defining a boundary B1 depending on a signal CACHE BOUNDARY from current storage element 244. Therefore, tuneable cache 800 changes from the structure illustrated in FIG. 8A to the structure illustrated in FIG. 8B, i.e. has a larger instruction cache 840 and a smaller data cache 850 when cache configuration circuit 810 redefines the boundary B2 as being between storage elements I1–IR and D1–D2 depending on the signal CACHE BOUNDARY.

Cache configuration circuit 810 keeps track of the rate of hits in the instruction cache and in the data cache for use in deciding allocation of storage elements between an instruction cache and a data cache. For example, a small instruction cache may be adequate when a function is repeatedly performed on a large amount of data, whereas a large instruction cache may be appropriate if a complex number crunching function is performed on a small amount of data.

Figure 8D:
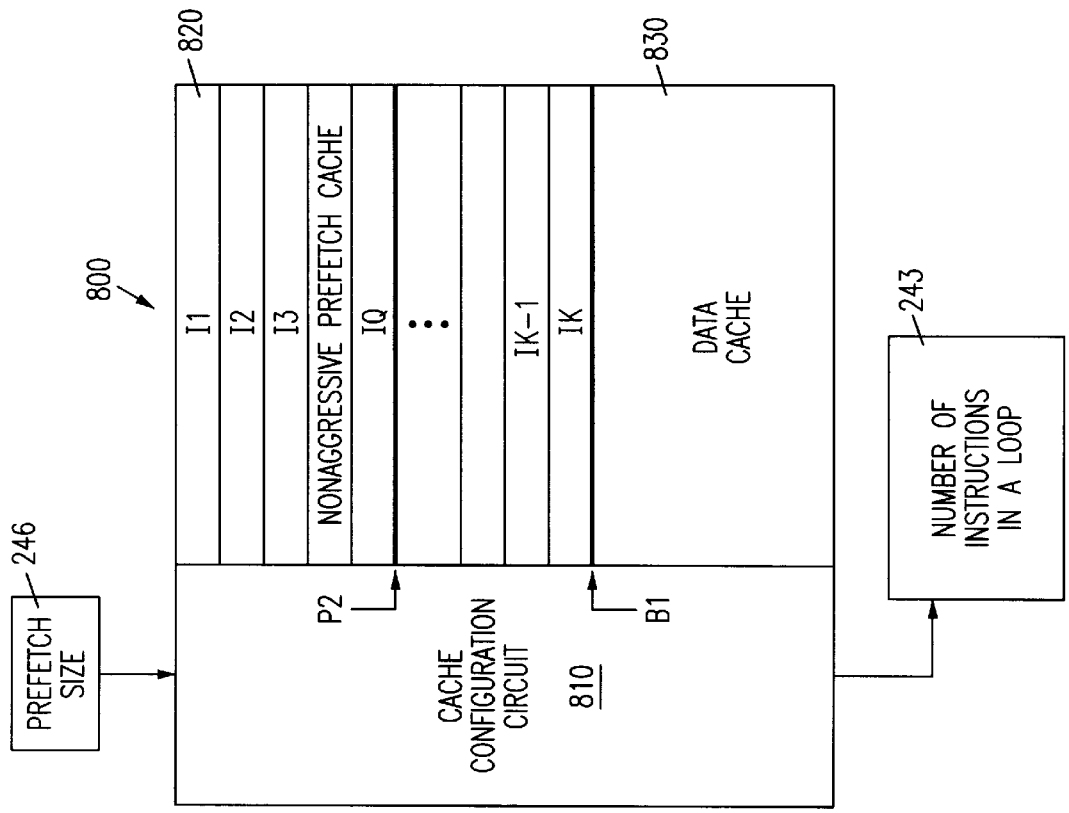
Figure 8C:
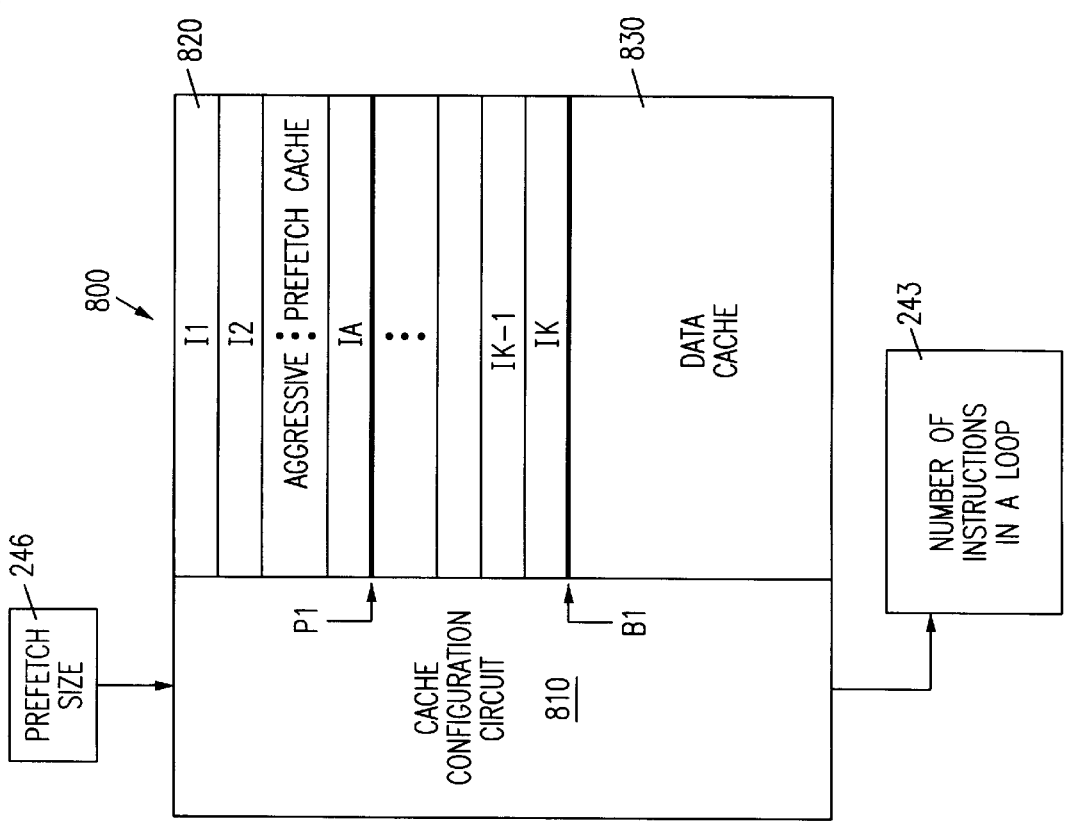

Similarly, cache configuration circuit 810 changes boundary AP that defines the number of storage elements I1, I2 . . . IA used for prefetching of instructions depending on signal PREFETCH SIZE from current storage element 246. Therefore, tuneable cache 800 in FIG. 8D has a different structure that includes for example storage elements I1, I2 . . . IP that are smaller in number than the storage elements I1, I2 . . . IA, and therefore result in a nonaggressive prefetch. Cache configuration circuit 810 also drives the signal NUMBER OF INSTRUCTIONS IN A LOOP that is stored in statistics storage element 243, and is used to determine the appropriate value of the parameter signal PREFETCH SIZE.

Cache configuration circuit 810 is also responsive to a signal CACHE REPLACEMENT MODE from current storage element 245 and selects one of predetermined structures, such as FIFO logic 831 and LRU logic 832. Specifically, in response to an inactive signal CACHE REPLACEMENT MODE cache configuration circuit 810 selects FIFO logic 831 for use in replacement of entries from the storage elements in tuneable cache 800 to main memory 22 as illustrated in FIG. 8E.

Figure 8F:
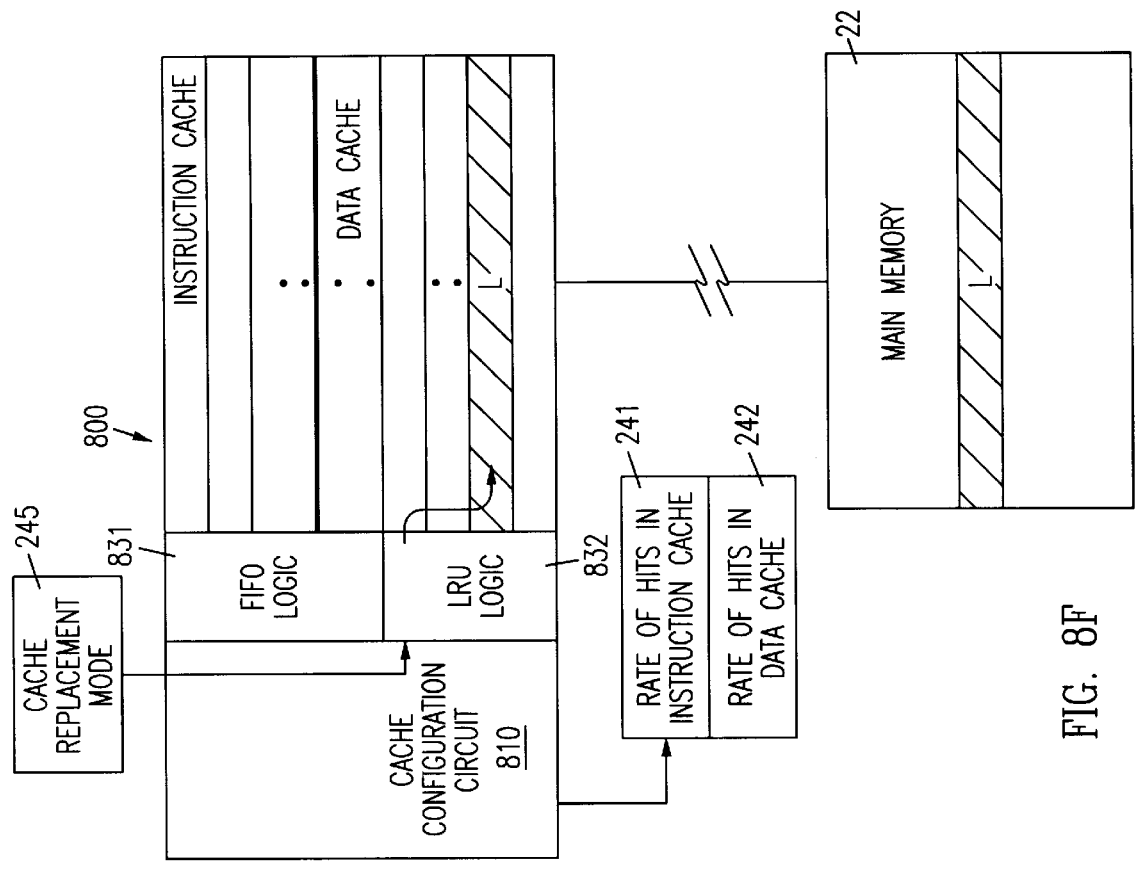
Figure 8E:
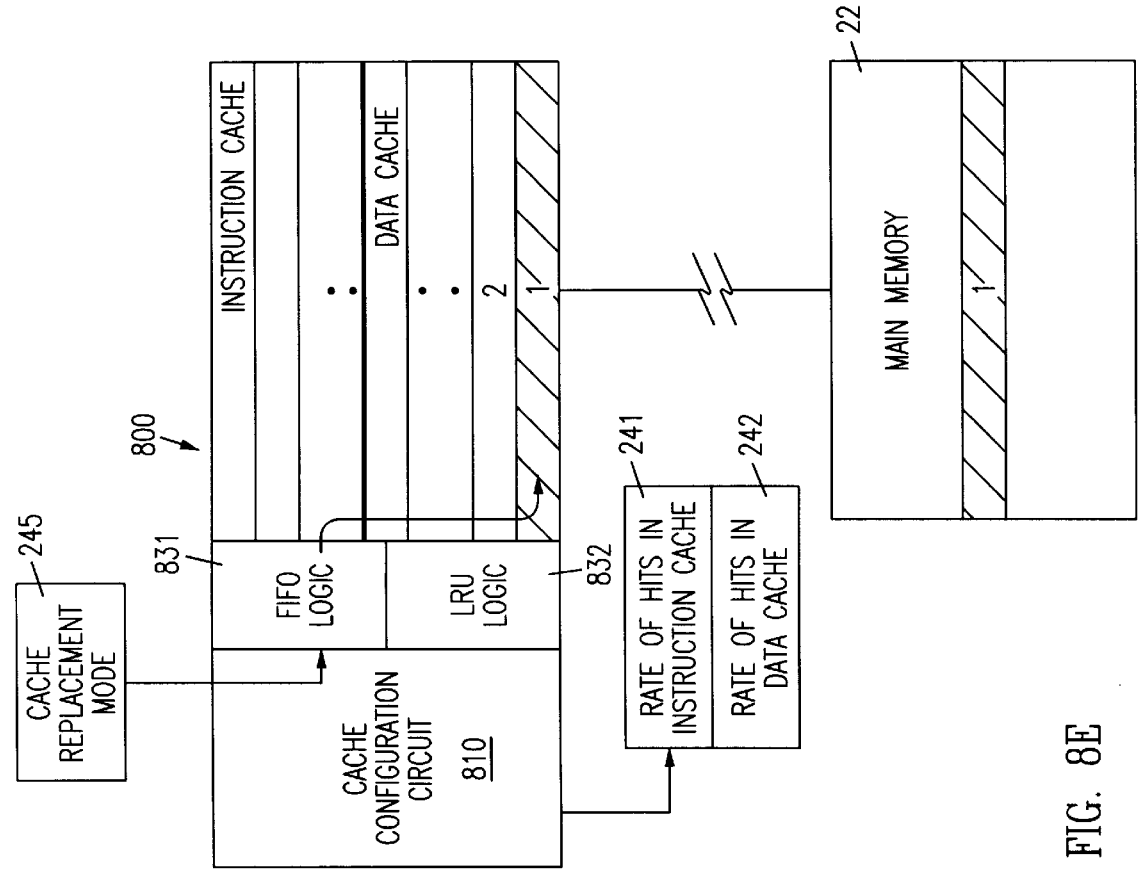

Moreover, in response to an active signal CACHE REPLACEMENT MODE cache configuration circuit 810 selects LRU logic 832 for replacement of entries to main memory 22 as illustrated in FIG. 8F. As described above, cache configuration circuit 810 drives the signal RATE OF HITS IN INSTRUCTION CACHE and RATE OF HITS IN DATA CACHE.

Cache configuration circuit 810 is also responsive to a signal CACHE ORGANIZATION MODE from current storage element 246, having one of the four values DIRECT MAP, 2-WAY SET ASSOCIATIVE, 4-WAY SET ASSOCIATIVE and FULLY ASSOCIATIVE. Depending on the signal CACHE ORGANIZATION MODE cache configuration circuit 810 rearranges the storage elements in tuneable cache 800 into one of the four structures illustrated in FIGS. 9A–9D.

Numerous modifications and adaptions of the above described embodiments will be obvious to a person of skill in the art of designing microprocessors in view of the enclosed disclosure. For example, the devices and methods described herein can be used with the devices and methods described in the above-incorporated applications, U.S. Pat. No. 5,812,425 and U.S. patent application Ser. No. 08/710, 336. Various such modifications and adaptions are encompassed by the attached claims.

We claim:

1. An assembly in a central processing unit (CPU), the assembly comprising:
    a tuning port having a configuration output line; and
    a tunable unit having a unit input terminal coupled to the configuration output line, the tunable unit including at least one predetermined device selected from a group consisting of a pipeline, an arithmetic logic unit, a bus interface unit, a cache, a branch prediction unit and a floating point unit, said predetermined device comprising each of:
    a first predetermined circuit; and
    a second predetermined circuit;
    wherein:
        the first predetermined circuit is coupled to other circuitry in the assembly when a first parameter signal is received on the unit input terminal; and
        the second predetermined circuit is coupled to said other circuitry in the assembly when a second parameter signal is received on the unit input terminal.

2. The assembly of claim 1 wherein the tuning port comprises:
    a configuration switch line;
    a shadow storage element; and
    a current storage element coupled to the shadow storage element and to the configuration switch line;
    wherein the current storage element stores a signal from the shadow storage element and drives the stored signal on the configuration output line,
    wherein the shadow storage element stores a new signal, and
    further wherein in response to an active signal on the configuration switch terminal the current storage element stores the new signal from the shadow storage element and drives the new signal on the configuration output line.

3. The assembly of claim 1, wherein
    the tunable unit also has a unit output terminal and the unit drives a statistics signal on the unit output terminal, the statistics signal being indicative of efficiency in operation of the unit; and
    the tuning port further comprises
        a statistics input line coupled to the unit output terminal;
        a statistics output terminal; and
        a storage element coupled between the statistics input line and the statistics output terminal.

4. The assembly of claim 1, wherein:
    the parameter signal has only one of a plurality of values in a predetermined range, the predetermined range including the first value and the second value; and
    each of the first predetermined circuit and the second predetermined circuit are specific to the tunable unit.

5. The assembly of claim 1 wherein:
    the second predetermined circuit includes the first predetermined circuit.

6. The assembly of claim 5 wherein:
    the first predetermined circuit has an N-bit structure, and the second predetermined circuit has a 2N-bit structure.

7. The assembly of claim 6 wherein:
    the first predetermined circuit is a first arithmetic logic unit; and
    the second predetermined circuit is a second arithmetic logic unit.

8. The assembly of claim 5 wherein:
    the tunable unit includes a pipeline, the first predetermined circuit includes a first plurality of stages, and the second predetermined circuit includes at least one additional stage.

9. The assembly of claim 1 wherein:
    the second predetermined circuit is physically distinct from the first predetermined circuit.

10. The assembly of claim 9 wherein:
    the tunable unit includes a cache, the first predetermined circuit includes a first-in-first-out (FIFO) logic, and the second predetermined circuit has a least-recently-used (LRU) logic.

11. The assembly of claim 9 wherein:
    the tunable unit includes a floating point unit comprising a plurality of rounding logics selected from the group consisting of a round up logic, a round down logic, a truncate logic and a round-to-nearest-even logic; and
    the first predetermined circuit includes a first rounding logic and the second predetermined circuit includes a second rounding logic.

12. The assembly of claim 1 wherein:
the first predetermined circuit includes a branch target cache; and
the second predetermined circuit includes a branch prediction logic.

13. The assembly of claim 1 wherein:
the first predetermined circuit includes a direct mapped cache; and
the second predetermined circuit includes a set associative cache.

14. The assembly of claim 1 wherein:
the first predetermined circuit includes a fully associative cache; and
the second predetermined circuit includes a set associative cache.

15. The assembly of claim 1 wherein:
the first predetermined circuit includes a first hardwired logic having a first predetermined structure; and
the second predetermined circuit includes a second hardwired logic having a second predetermined structure.

16. The assembly of claim 1 wherein:
the first predetermined circuit includes a first group of storage elements connected in a first predetermined structure; and
the second predetermined circuit includes a second group of storage elements connected in a second predetermined structure.

17. An assembly in a central processing unit (CPU), the assembly comprising:
a tuning port having a configuration input terminal, and a configuration output line, wherein during operation the tuning port drives a first parameter signal on the configuration output line, stores a second parameter signal on receipt of the second parameter signal at the configuration input terminal, and drives the second parameter signal on the configuration output line in response to an active signal on the configuration switch terminal; and
a tunable unit having a unit input terminal coupled to the configuration output line, the tunable unit including at least one device selected from a group consisting of a pipeline, an arithmetic logic unit, a bus interface unit, a cache, a branch prediction unit and a floating point unit, the tunable unit comprising circuitry operating differently depending on a parameter signal received on the unit input terminal;
wherein the at least one device is an arithmetic logic unit;
further wherein the arithmetic logic unit executes first application programs having a first programming model of a first predetermined size of N bits faster than execution of second application programs having a second programming model of a second predetermined size of 2N bits prior to receipt of the second parameter signal; and
further wherein the arithmetic logic unit executes instruction words of the second application programs faster than the first application programs subsequent to receipt of the second parameter signal.

18. The assembly of claim 17 wherein N=16.

19. An assembly in a central processing unit (CPU), the assembly comprising:
a tuning port having a configuration input terminal, and a configuration output line, wherein during operation the tuning port drives a first parameter signal on the configuration output line, stores a second parameter signal on receipt of the second parameter signal at the configuration input terminal, and drives the second parameter signal on the configuration output line in response to an active signal on the configuration switch terminal; and
a tunable unit having a unit input terminal coupled to the configuration output line, the tunable unit including at least one device selected from a group consisting of a pipeline, an arithmetic logic unit, a bus interface unit, a cache, a branch prediction unit and a floating point unit, the tunable unit comprising circuitry operating differently depending on a parameter signal received on the unit input terminal; wherein the at least one device is an instruction cache including a plurality of storage elements;
further wherein the instruction cache uses a first number of storage elements to store prefetched instruction words, and uses storage elements other than the first number storage elements to store executed instruction words prior to receipt of the second parameter signal; and
further wherein the instruction cache uses a second number of storage elements to store prefetched instruction words, and uses storage elements other than the second number storage elements to store executed instruction words subsequent to receipt of the second parameter signal.

20. An assembly in a central processing unit (CPU), the assembly comprising:
a tuning port having a configuration input terminal, and a configuration output line, wherein during operation the tuning port drives a first parameter signal on the configuration output line, stores a second parameter signal on receipt of the second parameter signal at the configuration input terminal, and drives the second parameter signal on the configuration output line in response to an active signal on the configuration switch terminal; and
a tunable unit having a unit input terminal coupled to the configuration output line, the tunable unit including at least one device selected from a group consisting of a pipeline, an arithmetic logic unit, a bus interface unit, a cache, a branch prediction unit and a floating point unit, the tunable unit comprising circuitry operating differently depending on a parameter signal received on the unit input terminal;
wherein the at least one device is a cache;
further wherein the cache replaces words in a first-in-first-out manner prior to receipt of the second parameter signal; and
further wherein the cache replaces words in a last-in-first-out manner subsequent to receipt of the second parameter signal.

21. An assembly in a central processing unit (CPU), the assembly comprising:
a tuning port having a configuration input terminal, and a configuration output line, wherein during operation the tuning port drives a first parameter signal on the configuration output line, stores a second parameter signal on receipt of the second parameter signal at the configuration input terminal, and drives the second parameter signal on the configuration output line in response to an active signal on the configuration switch terminal; and
a tunable unit having a unit input terminal coupled to the configuration output line, the tunable unit including at least one device selected from a group consisting of a pipeline, an arithmetic logic unit, a bus interface unit, a cache, a branch prediction unit and a floating point unit, the tunable unit comprising circuitry operating differently depending on a parameter signal received on the unit input terminal;

wherein the at least one device is a cache;

further wherein a word is written back only to the cache prior to receipt of the second parameter signal; and further wherein a word is written through to the cache and to a main memory coupled to the cache subsequent to receipt of the second parameter signal.

22. An assembly in a central processing unit (CPU), the assembly comprising:

a tuning port having a configuration input terminal, and a configuration output line, wherein during operation the tuning port drives a first parameter signal on the configuration output line, stores a second parameter signal on receipt of the second parameter signal at the configuration input terminal, and drives the second parameter signal on the configuration output line in response to an active signal on the configuration switch terminal; and a tunable unit having a unit input terminal coupled to the configuration output line, the tunable unit including at least one device selected from a group consisting of a pipeline, an arithmetic logic unit, a bus interface unit, a cache, a branch prediction unit and a floating point unit, the tunable unit comprising circuitry operating differently depending on a parameter signal received on the unit input terminal;

wherein the at least one device is a cache including a plurality of storage elements;

further wherein the cache uses a first number of storage elements to store data words, and uses storage elements other than the first number storage elements to store instruction words prior to receipt of the second parameter signal; and further wherein the cache uses a second number of storage elements store data words, and uses storage elements other than the second number storage elements to store instruction words subsequent to receipt of the second parameter signal.

23. An assembly in a central processing unit (CPU), the assembly comprising:

a tuning port having a configuration input terminal, and a configuration output line, wherein during operation the tuning port drives a first parameter signal on the configuration output line, stores a second parameter signal on receipt of the second parameter signal at the configuration input terminal, and drives the second parameter signal on the configuration output line in response to an active signal on the configuration switch terminal; and a tunable unit having a unit input terminal coupled to the configuration output line, the tunable unit including at least one device selected from a group consisting of a pipeline, an arithmetic logic unit, a bus interface unit, a cache, a branch prediction unit and a floating point unit, the tunable unit comprising circuitry operating differently depending on a parameter signal received on the unit input terminal;

wherein the at least one device is a branch prediction unit;

further wherein the branch prediction unit assumes branch forward not taken and branch backward taken for predicting a branch during execution of instruction words prior to receipt of the second parameter signal; and further wherein the branch prediction unit uses a branch history table for predicting a branch during execution of instruction words subsequent to receipt of the second parameter signal.

24. An assembly in a central processing unit (CPU), the assembly comprising:

a tuning port having a configuration input terminal, and a configuration output line; and a tunable unit having a unit input terminal coupled to the configuration output line, the tunable unit including at least one device selected from a group consisting of a pipeline, an arithmetic logic unit, a bus interface unit, a cache, a branch prediction unit and a floating point unit;

wherein the at least one device is a pipeline;

further wherein the pipeline has a first number of stages prior to receipt of the second parameter signal; and further wherein the pipeline has a second number of stages subsequent to receipt of the second parameter signal.

25. The assembly of claim 24 wherein:

during operation the tuning port drives a first parameter signal on the configuration output line, stores a second parameter signal on receipt of the second parameter signal at the configuration input terminal, and drives the second parameter signal on the configuration output line in response to an active signal on the configuration switch terminal; and the tunable unit includes circuitry that operates differently depending on a parameter signal received on the unit input terminal.

26. An assembly in a central processing unit (CPU), the assembly comprising:

a tuning port having a configuration input terminal, and a configuration output line, wherein during operation the tuning port drives a first parameter signal on the configuration output line, stores a second parameter signal on receipt of the second parameter signal at the configuration input terminal, and drives the second parameter signal on the configuration output line in response to an active signal on the configuration switch terminal; and a tunable unit having a unit input terminal coupled to the configuration output line, the tunable unit including at least one device selected from a group consisting of a pipeline, an arithmetic logic unit, a bus interface unit, a cache, a branch prediction unit and a floating point unit, the tunable unit comprising circuitry operating differently depending on a parameter signal received on the unit input terminal;

wherein the at least one device is a floating point unit;

further wherein the floating point unit rounds a significand to a first round-off length prior to receipt of the second parameter signal; and further wherein the floating point unit rounds a significand to a second round-off length subsequent to receipt of the second parameter signal.

27. An assembly in a central processing unit (CPU), the assembly comprising:

a tuning port having a configuration input terminal, and a configuration output line, wherein during operation the tuning port drives a first parameter signal on the configuration output line, stores a second parameter signal on receipt of the second parameter signal at the configuration input terminal, and drives the second parameter signal on the configuration output line in response to an active signal on the configuration switch terminal; and a tunable unit having a unit input terminal coupled to the configuration output line, the tunable unit including at least one device selected from a group consisting of a pipeline, an arithmetic logic unit, a bus interface unit, a cache, a branch prediction unit and a floating point unit, the tunable unit comprising circuitry operating differently depending on a parameter signal received on the unit input terminal;

wherein the at least one device is a floating point unit comprising a plurality of rounding logics, said plurality of rounding logics consisting of a round up logic, a round down logic, a truncate logic and a round-to-nearest-even logic;

further wherein the floating point unit uses a first rounding logic of said plurality of rounding logics to round a significant prior to receipt of the second parameter signal; and further wherein the floating point unit uses a second rounding logic of said plurality of rounding logics to round a significant subsequent to receipt of the second parameter signal.

28. An assembly in a central processing unit (CPU), the assembly comprising:

means for tuning a plurality of means in the CPU, the means for tuning having a plurality of configuration input terminals, a plurality of configuration output lines corresponding to the plurality of configuration input terminals and a configuration switch terminal, the means for tuning including a first set of storage elements for storing signals received at said plurality of configuration input terminals and a second set of storage elements for storing signals supplied to said plurality of configuration output lines, the plurality of means including means for executing instruction words, means for storing instruction words being executed by the means for executing, and means for predicting branches during execution of the instruction words;

wherein during operation of the CPU, the means for tuning drives a plurality of first parameter signals on said plurality of configuration output lines, stores at least one second parameter signal in a storage element of the first set on receipt of the second parameter signal at a configuration input terminal, and in response to an active signal on the configuration switch terminal, copies the stored second parameter signal from the first set storage element to a storage element in the second set and drives the second parameter signal on a corresponding configuration output line, further wherein the plurality of parameter signals includes an execution parameter signal, a storage parameter signal and a prediction parameter signal;

the means for executing instructions having an input terminal coupled to a first configuration output line, the means for executing comprising circuitry capable of organization into one of at least two predetermined execution structures;

wherein circuitry in the means for executing is organized into a first predetermined execution structure on receipt of a first execution parameter signal on the unit input terminal, the first execution parameter signal being indicative of the first predetermined execution structure and wherein circuitry in the means for executing is organized into a second predetermined execution structure on receipt of a second execution parameter signal on the unit input terminal, the second execution parameter signal being indicative of the second predetermined execution structure;

the means for storing having a storage input terminal coupled to a second configuration output line, the means for storage comprising circuitry capable of organization into one of at least two predetermined storage structures;

wherein circuitry in the means for storing is organized into a first predetermined storage structure on receipt of a first storage parameter signal on the storage input terminal, the first storage parameter signal being indicative of the first predetermined storage structure, and circuitry in the means for storing is organized into the second predetermined storage structure on receipt of a second storage parameter signal on the storage input terminal, the second storage parameter signal being indicative of the second predetermined storage structure; and the means for predicting having a prediction input terminal coupled to a third configuration output line, the means for predicting comprising circuitry capable of organization into one of at least two predetermined branch prediction structures;

wherein circuitry in the means for predicting branches is organized into a first predetermined branch prediction structure on receipt of a first prediction parameter signal on the prediction input terminal, the first prediction parameter signal being indicative of the first predetermined branch prediction structure, and circuitry in the means for predicting branches is organized into a second predetermined branch prediction structure on receipt of a second prediction parameter signal on the storage input terminal, the second prediction parameter signal being indicative of the second predetermined branch prediction structure.

29. The assembly of claim 28 wherein the means for executing executes first application programs having a first programming model of a first predetermined size of N bits faster than execution of second application programs having a second programming model of a second predetermined size of 2N bits when the means for executing includes the first predetermined execution structure, and further wherein the means for executing executes the second application programs faster than the first application programs when the means for executing includes the second predetermined execution structure.

30. The assembly of claim 28 wherein the means for predicting assumes branch forward not taken and branch backward taken in predicting a branch when means for predicting includes the first predetermined branch prediction structure, and uses a branch history table for predicting a branch when the means for predicting includes the second predetermined structure.

31. The assembly of claim 28 wherein the means for storing uses a first number of storage elements to store prefetched instruction words, and uses storage elements other than the first number storage elements to store executed instruction words when the circuitry has the first predetermined structure, further wherein the means for storing uses a second number of storage elements to store prefetched instruction words, and uses storage elements other than the second number storage elements to store executed instruction words when the circuitry has the second predetermined structure.

32. The assembly of claim 28 further comprising:

means for performing floating point arithmetic having a rounding-mode input terminal coupled to a fourth configuration output line, the means for performing comprising a plurality of rounding logics, the plurality of rounding logics consisting of a round up logic, a round down logic, a truncate logic and a round-to-nearest-even logic, the means for performing using one of the plurality of rounding logics to round a significant depending on a signal received at the rounding-mode input terminal.

33. The assembly of claim 28, wherein each of the means for executing, means for predicting and means for storing has a unit output terminal and each of the means drives a statistics signal on the respective unit output terminal, the statistics signal being indicative of operation of the respective means; and the means for tuning further comprises
  a plurality of statistics input lines coupled to the unit output terminals;
  a plurality of statistics output terminals; and
  a plurality of storage elements coupled between the statistics input lines and the statistics output terminals such that the storage elements store statistics signals from the statistics input lines and drive the stored statistics signals on the statistics output terminals.

34. The assembly of claim 33 wherein the means for tuning further comprises means for averaging the statistics signals prior to storage in said storage elements.

35. The assembly of 28 further comprising:

means for evaluating a plurality of statistics to determine a multi-valued parameter signal, said means for evaluating passing said determined signal to one of said configuration input terminals of said means for tuning.

36. The assembly of claim 35, wherein said means for evaluating comprises means for comparing a statistic in said plurality with a predetermined statistic.

37. The assembly of claim 36, wherein said means for evaluating comprises means for determining a multi-valued parameter signal coupled to said means for comparing.

38. A method for changing operation of a central processing unit (CPU), the method comprising:

driving a parameter signal, said parameter signal having a value in a range of multiple values; and changing operation of circuitry of the CPU depending on the parameter signal, wherein the circuitry operates differently for each value in the range;

executing a first application program having a first programming model of a first predetermined size of N bits faster than a second application program having a second programming model of a second predetermined size of 2N bits prior to said driving; and executing the second application program faster than the application program subsequent to said changing.

39. A method for changing operation of a central processing unit (CPU), the method comprising:

driving a parameter signal, said parameter signal having a value in a range of multiple values; and changing operation of circuitry of the CPU depending on the parameter signal, wherein the circuitry operates differently for each value in the range;

using a first number of storage elements to store prefetched instruction words, and uses storage elements other than the first number storage elements to store executed instruction words prior to said driving; and using a second number of storage elements to store prefetched instruction words, and using storage elements other than the second number storage elements to store executed instruction words subsequent to said changing.

40. A method for changing operation of a central processing unit (CPU), the method comprising:

driving a parameter signal, said parameter signal having a value in a range of multiple values;

changing operation of circuitry of the CPU depending on the parameter signal, wherein the circuitry includes a first predetermined circuit and a second predetermined circuit, wherein said changing includes:
  coupling said first predetermined circuit to other circuitry if said parameter signal has a first value; and
  coupling said second predetermined circuit to said other circuitry if said parameter signal has a second value; and evaluating a plurality of statistics to determine the parameter signal; and passing said parameter signal to said circuitry.

* * * * *